July 8, 1941.                O. SEVERSON                 2,248,468
                             MILLING MACHINE
                           Filed June 27, 1939
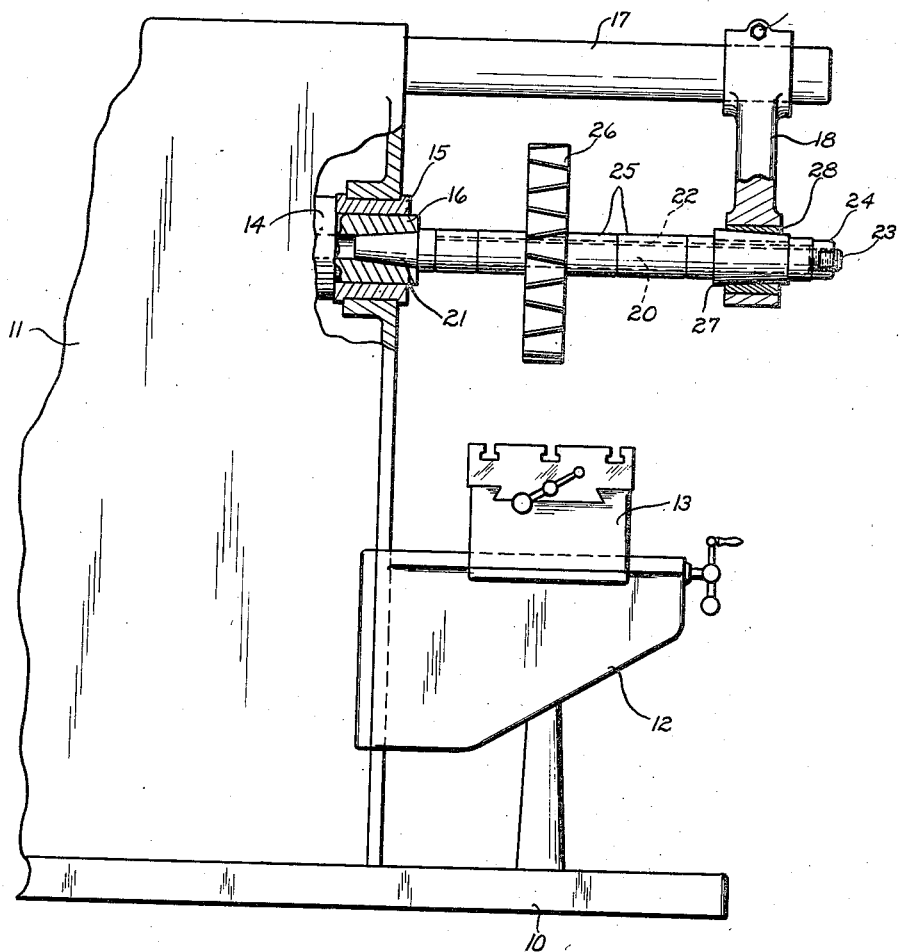
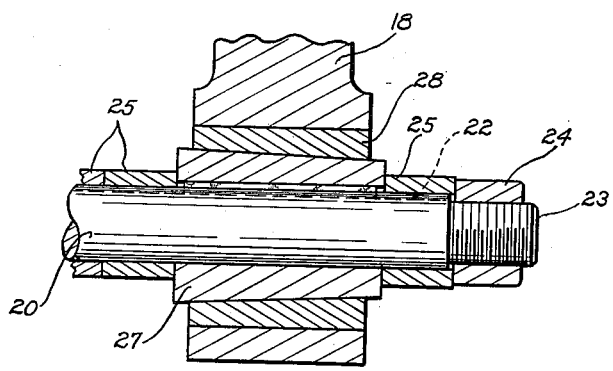
INVENTOR
OLE SEVERSON
BY
A. T. Sperry
ATTORNEYS

UNITED STATES PATENT OFFICE 2,248,468

MILLING MACHINE

Ole Severson, Shelton, Conn.

Application June 27, 1939, Serial No. 281,409

1 Claim. (Cl. 90—11)

This invention relates to milling machines and is particularly concerned with arbor bearings therefor.

It is among the objects of the invention to provide a milling machine assembly in which an improved arbor bearing is provided so as to insure a smooth chatterless rotation of the arbor in its bearing and to provide a bearing which will efficiently and effectively support the arbor in such a manner as to resist cutting stresses and strains to which it is subjected while in operation.

Another object of the invention is to provide a bearing arrangement for the arbor of a milling machine which will not only act as a simple bearing for the arbor, but which will further act to preload the arbor, thus putting the same under a longitudinal thrusting pressure, thus to insure a long life of chatterless use of the arbor before adjustment of arbor cutters or bearing is necessary. Another object of the invention is to provide an outboard arbor bearing which will act as a thrust bearing for receiving thrusting pressures which are received by the arbor during cutting operations.

A further and specifically important object of the invention is to provide a ready adjustment for the arbor bearing so that when wear occurs, such wear may be readily compensated for by adjustment, thus avoiding the present day necessity for replacement of bearings or the use of shims in correcting a loose bearing.

It is specifically among the objects of the invention to provide a conical arbor bearing which, by adjustment of the bearing support, the milling machine may act to place the arbor under a thrusting pressure and which may be adjusted to, at all times, provide a proper snug bearing for the arbor.

Numerous other objects and features of the invention will be apparent from a consideration of the following specifications taken in conjunction with the accompanying drawing, in which:

Figure 1 is a side elevation of a milling machine embodying the present invention, the bearing parts being shown in vertical section; and Figure 2 is an enlarged vertical section through the outer end of the arbor and its bearing.

In present day knee type milling machines, the arbor is mounted in the chuck frequently being retained therein by a type of threaded draw bolt arrangement which is used to retain the tapered inner end of the arbor within the tapered socket of the milling machine spindle chuck. The outer end of the arbor is usually supported by extending through a plane cylindrical bearing carried by a bearing support depending from and slidable upon a bearing arm projecting outwardly over the table. This arrangement provides an outboard bearing for the milling arbor. Such devices, however, do not (without adjunct equipment) provide for any outer thrust bearing for the arbor or any means of preloading the arbor and when wear occurs, a disassembly of parts is necessary in order to replace the bearing or insert shims in order to compensate for wear.

The present invention overcomes these limitations by providing a conical bearing in the bearing support and a conical bearing member carried by the arbor. In such arrangement, wear may be compensated for by a simple adjustment of the bearing support on the bearing arm. Such adjustment also places a preloading pressure upon the arbor tending to force the same securely into the conical seat of the chuck and the arrangement also provides an outboard endthrust bearing which receives outward thrusts of the arbor. In modern milling machine practice, the use of milling cutters having angularly disposed blades (as shown) is becoming increasingly popular. It will be seen that such blades while cutting give first an inward and then an outward thrust to the arbor, thus straining the securing means for the arbor within its chuck. End thrust bearings for arbors have been invented, but such devices are either in lieu of the usual outboard bearing or are an added device. In the present invention, an adjustable outboard bearing is provided which by its adjustment may act as a thrust bearing for the arbor.

Referring more particularly to the drawing, the machine depicted is, in general, of conventional form, having a base, 10, body, 11, and knee, 12, upon which the table, 13, is mounted. The body, 11, houses the spindle, 14, which may be provided with a suitable bearing, 15. The spindle chuck is indicated at 16 and is provided with a conical arbor receiving recess. Extending outwardly from the body, 11, is a bearing arm, 17, upon which is slidably mounted the bearing support, 18, which may be secured in its adjusted position thereon as by one or more securing screws, 19. Such structure as thus described is of conventional form and no claim to such is here made. Obviously the present invention is applicable to various milling machines of this and other general types and the claim hereof is not to be construed as limited to specific details of construction here shown.

The conventional milling machine arbor is indicated at 20 and has a conical end, 21, receivable within the chuck, 16. A key way, 22, is provided throughout its length and its outer end terminates in a threaded portion, 23, upon which the securing nut, 24, is mounted. Upon the arbor, 20, conventional spacers, 25, are mounted as well as one or more cutters, 26.

In place of the usual plane bearing for the outer end of the arbor, the present invention provides a conical bearing, 27, tapering outwardly and preferably keyed to the arbor. Cooperating with the arbor bearing, element 27, the bearing support, 18, also carries a conical outer bearing element, 28, which is secured thereto in any suitable manner.

With this construction, it will be noted that element 27 turns with the arbor, while element 28 remains stationary, thus wear will take place upon their conical surfaces. Compensation for such wear may be readily attained by releasing screws, 19, and moving the support, 18, towards the body, 11. It will be further noted that such adjustment acts to place the arbor under a tension in the direction of the chuck, thus causing the arbor to continuously force itself tightly into the conical chuck seat. It will also be noted that the interrelation of conical surfaces is such as to preclude outward movement of the arbor and the bearing thus acts as a thrust bearing for the arbor.

It will, of course, be understood that numerous changes, modification and the full use of equivalents may be resorted to in the present invention without departing from the spirit or scope of the appended claim.

What I claim is:

In a milling machine, the combination with an arbor chuck having a conical arbor seat, an arbor having a conical end received within said seat and an outboard arbor bearing support adjustable longitudinally of said arbor, of a removable bearing member mounted for rotation with said arbor intermediate its ends and having an external conical bearing surface and a cooperating non-rotatable bearing member having an internal conical bearing surface carried by said adjustable support, said bearings being arranged with their smaller ends in the direction of the free end of the arbor whereby adjustment of the outboard bearing support inwardly of the free end of the arbor will load the arbor in the direction of said chuck.

OLE SEVERSON.